United States Patent [19]

Iwai et al.

[11] Patent Number: 5,532,450
[45] Date of Patent: Jul. 2, 1996

[54] APPARATUS AND METHOD CAPABLE OF MANUFACTURING TWO OR MORE DIFFERENT TYPES OF WELDED PANELS

[75] Inventors: Takao Iwai; Kimikazu Ikemoto; Taminori Yanagisawa, all of Toyota; Fumiaki Natsumi, Okazaki; Toshiro Shiraki, Toyota, all of Japan

[73] Assignee: Toyota Jidosha Kabushiki Kaisha, Toyota, Japan

[21] Appl. No.: 46,868

[22] Filed: Apr. 8, 1993

[30] Foreign Application Priority Data

Apr. 9, 1992  [JP]  Japan ..................................... 4-118099

[51] Int. Cl.$^6$ ................................................ B23K 26/00
[52] U.S. Cl. ............................... 219/121.63; 219/121.64; 219/121.82; 219/121.58; 29/465; 29/897.2; 228/6.1; 228/44.3
[58] Field of Search ......................... 219/121.85, 121.61, 219/121.63, 121.64, 121.82, 121.58; 29/897.2, 464, 465; 228/4.1, 44.3, 6.1, 5.7

[56] References Cited

U.S. PATENT DOCUMENTS

| | | | |
|---|---|---|---|
| 4,205,216 | 5/1980 | Douglas | 219/121.64 |
| 4,473,935 | 10/1984 | Tatsuura et al. | |
| 4,825,032 | 4/1989 | Duncan | 219/121.63 |
| 4,827,100 | 5/1989 | Fringes et al. | |
| 4,902,872 | 2/1990 | Fringes et al. | |
| 4,959,521 | 9/1990 | Maruyama et al. | 219/121.63 |
| 5,098,005 | 3/1992 | Jack | 228/4.1 |
| 5,192,848 | 3/1993 | Miyakawa et al. | 219/121.82 |
| 5,328,083 | 7/1994 | Peru et al. | 228/5.7 |

FOREIGN PATENT DOCUMENTS

| | | |
|---|---|---|
| 8313899 | 3/1984 | France . |
| 59-141391 | 8/1984 | Japan . |
| 59-220229 | 12/1984 | Japan . |
| 60-108189 | 6/1985 | Japan . |
| 60-154882 | 8/1985 | Japan . |
| 62-110886 | 5/1987 | Japan . |
| 63-309396 | 12/1988 | Japan . |
| 362516 | 9/1991 | Japan . |

OTHER PUBLICATIONS

Patent Abstract of Japan vol. 9 No. 94(M–374)(1817) 4/1985 re JP–A 59220229.
Patent Abstract of Japan vol. 8 No. 270(M–344)(1707) 12/1984 re JP–A 59141391.

*Primary Examiner*—Mark H. Paschall
*Attorney, Agent, or Firm*—Cushman, Darby & Cushman

[57] ABSTRACT

An apparatus for manufacturing a single welded panel from a plurality of material panels by abutting together the material panels using a welder member and irradiating the abutted edges with a welding beam. The apparatus includes two or more bases each provided for each type of welded panel to be manufactured and for supporting the welder member and material panels for the each type of welded panel, and guide rails for guiding one of the bases to a welding beam irradiation region, whereby two or more different types of welded panels can be manufactured.

9 Claims, 8 Drawing Sheets

APPARATUS AND METHOD CAPABLE OF MANUFACTURING TWO OR MORE DIFFERENT TYPES OF WELDED PANELS

BACKGROUND OF THE INVENTION

This invention relates to an apparatus and a method capable of manufacturing a single welded panel by welding abutted edges of a plurality of material panels and, more particularly, to an apparatus and a method capable of manufacturing a plurality of different types of welded panels.

Figure 9:
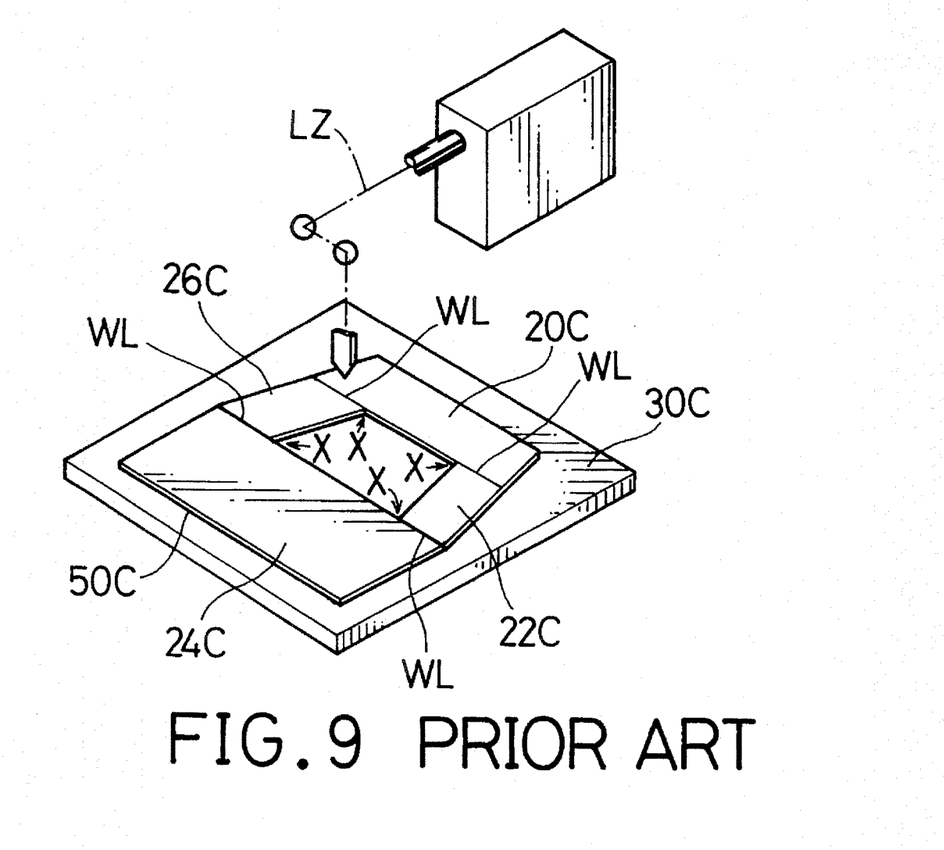
FIG. 9 is a view showing a prior art device.

When an automotive door panel is produced with a press from a single material, a portion thereof having a considerably large area corresponding to a window is wasted, which is undesired from the standpoint of the effective utilization of the material. Accordingly, an apparatus for manufacturing a welded panel 50C, as shown in FIG. 9, has been developed. In this apparatus, a plurality of material panels 20C, 22C, 24C and 26C are set in an abutting relation to one another using a welder member 30C and are welded together by irradiating their abutted edges WL with a welding beam (for instance a laser beam LZ). In this way, a single welded panel 50C is produced. This apparatus is disclosed in Japanese Laid-Open Patent Publication No. 59-220229.

Figure 10:
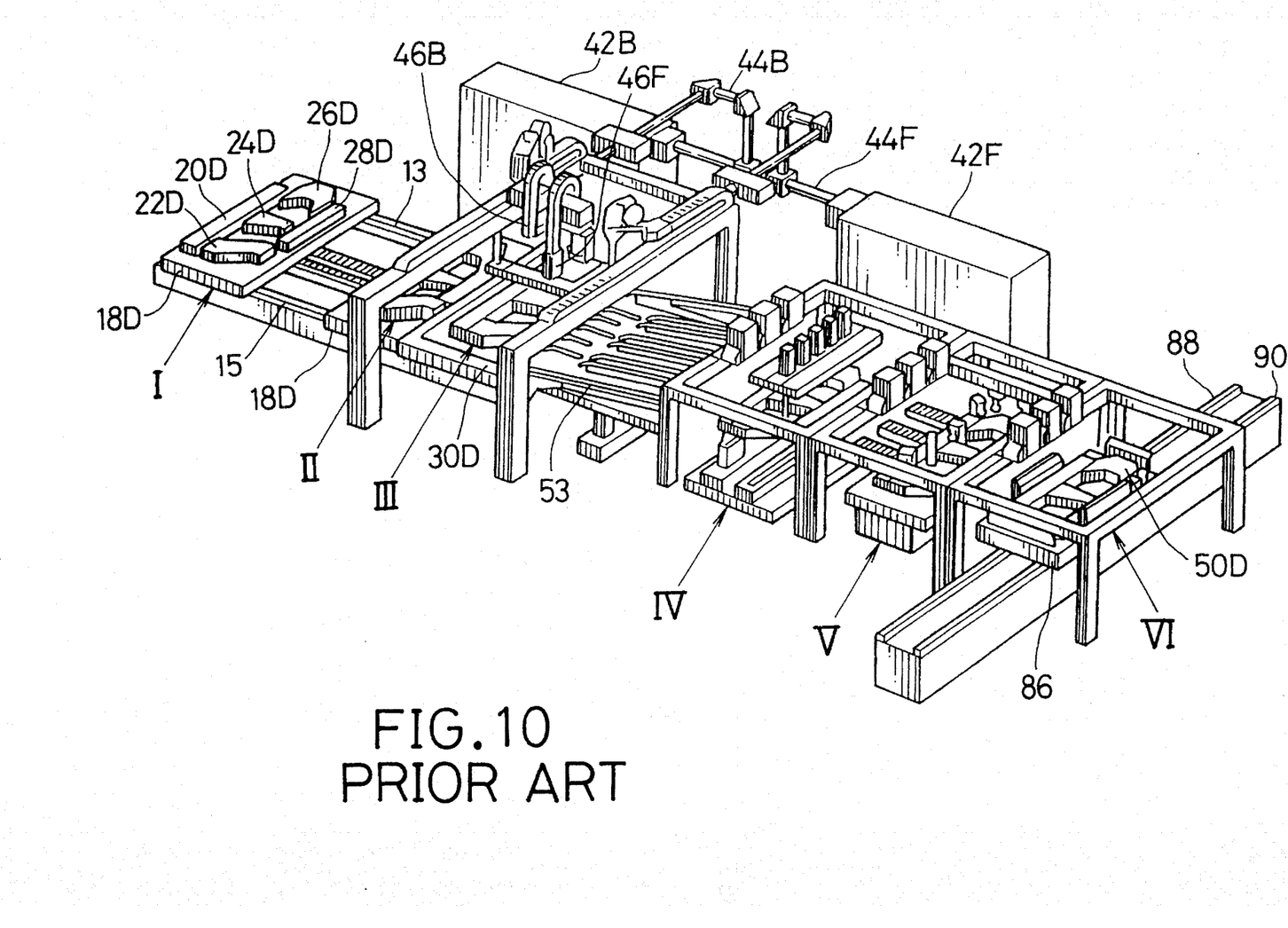
FIG. 10 is a view showing a prior art apparatus.

FIG. 10 shows an apparatus for welded panel manufacture, which realizes this technique. FIG. 9 shows an example of manufacturing a welded panel 50C of type C, while FIG. 10 shows an example of manufacturing a welded panel D of type D.

In FIG. 10, designated at I is a prearranging section, in which stacks of material panels 20D, 22D, 24D, 26D and 28D are set on a pallet 18D, which is moved along guide rails 13 and 15 to a material input section II. In the material input section II, the stacks of material panels 20D, 22D, 24D, 26D and 28D are fed one by one from the uppermost ones to a welder member 30D by a material feeder (not shown). In the welder member 30D, the individual material panels in a set are positioned such that their edges are abutted as in the example shown in FIG. 9. Designated at III is a welding section. In this section, the abutted edges WL as shown in FIG. 9 are irradiated with a laser beam coupled from a laser oscillator 42 via a torch 46. As a result, the material panels 20D, 22D, 24D, 26D and 28D in the set are welded together to obtain a single welded panel 50D. The welded panel 50D thus obtained is fed by a feeder 53 to a grinding section IV. In the grinding section IV, the welding bead is ground away with a rotating grindstone. Designated at V is a punching section, in which the corners (designated at X in FIG. 9) between adjacent abutted material panels are finished to be smooth by a punching process. Designated at VI are a stacking section, in which finished welded panels 50D are stacked on a base 86. When a predetermined number of finished welded panels are stacked, they are fed to the next step by moving the base 86 supporting them along guide rails 88 and 90.

When a single welded panel is produced by welding together the individual material panels in one set, the wasted material can be extremely reduced. However, the manufacture of one type of welded panel requires an exclusive manufacturing system, and it is difficult to provide a manufacturing system, which can manufacture a number of different types of welded panels; for instance, it is difficult for the apparatus shown in FIG. 10 to manufacture welded panels of types C and D.

In order to be able to manufacture a plurality of different types of welded panels with the apparatus shown in FIG. 10, it may be thought to permit movement of a positioning stopper for the welder member 30 and also positioning cylinders for the material panels such as to conform to the intended type of welded panel. However, for the irradiation of the abutted edges with a welding beam it is necessary for the positions of the abutted edges to have an accuracy of about 0.1 mm. Therefore, with the system, in which the position of the stopper for the welder member 30 is variable, it is impossible to ensure satisfactory welding.

As another proposal, it may be thought to prepare welder members 30 for different types of welded panels and provide means for guiding a welder member in a direction perpendicular to the direction of feed of the work so as to permit replacement of the welder member with desired ones. However, as shown in FIG. 10, the laser oscillator 42, the laser beam guide path 44, the mechanism for scanning the laser beam torch 46, etc. are disposed in a complicated manner along the edge of the welding section III requiring the welder member 30, and therefore it is extremely difficult to dispose the replacement means for the welder member 30 so as not to interfere with these components. Particularly, where a plurality of laser beam torches 46 are disposed (two torches 46B and 46F being disposed in the example of FIG. 10) to effect welding of a plurality of abutment edges at a time so as to improve the welding speed, the structure of the welding section III is correspondingly complicated, and it is extremely difficult to provide the replacement means for the welder member 30 so as to be free from the interference. Particularly, where laser oscillators are disposed on the opposite sides of the line, it is almost impossible to secure the welder member replacement paths.

For the above reasons, it is difficult to realize the idea of replacing the welder member 30.

SUMMARY OF THE INVENTION

A first object of the invention is to permit manufacture of two or more different types of welded panels with a single manufacturing apparatus.

To attain this object, according to the invention there is provided an apparatus for manufacturing a single welded panel from a plurality of material panels by abutting together the material panels using a welder member and irradiating the abutted edges with a welding beam, which comprises two or more bases each provided for each type of welded panel to be manufactured and for supporting the welder member and material panels for each said type of welded panel, and guide rails for guiding one of the bases to a welding beam irradiation region.

To attain the same object of the invention, there is also provided a method of manufacturing a single welded panel from a plurality of material panels by abutting together the material panels using a welder member and irradiating the abutted edges with a welding beam, which comprises the steps of preparing a plurality of bases each capable of supporting the material panels for each type of welded panel and a corresponding welder member, transferring the welder member having been placed in a welding beam irradiation region onto a base and transferring the welder member together with the base, and transporting separate base supporting material panels for a different type of welded panel and a corresponding welder member to the welding beam irradiation region by moving the base along the converse route to the transport from the welding beam irradiation region.

According to the above apparatus and method, on each base are supported a welder member necessary for producing a specific type of welded panel and also material panels necessary for the manufacture of this type of welded panel (i.e., four material panels 20C, 22C, 24C and 26C for type C and five material panels 20D, 22D, 24D, 26D and 28D for type D, it being possible to support a plurality of sets of material panels as shown in FIG. 10). At least two bases supporting the parts noted above are prepared, and one of them is guided to a welding beam irradiation region. Thus, the welder member is guided together with the corresponding material panels to the welding beam irradiation region. That is, no separate welder member replacing route is necessary from the material panel introduction route.

Thus, the feed-in and -out of the work and also the feed-in and -out of the welder member are possible while avoiding interference with the welding section, and it is possible to permit manufacture of two or more different types of welded panels with a single apparatus.

Another object of the invention is to simplify the replacement of the welder member. To this end, a welder member support space on the base, for supporting the welder member, has an opening, through which the welder member is raised from the base by a lift being raised. Further, a frame is disposed above the welding beam irradiation region, and an upper die of the welder member can be mounted on the frame.

The upper die is thus mounted and dismounted by the lift. Also, the upper and lower dies can be opened and closed by the same lift.

A further object of the invention is to cause strong abutment of material panel edges. To this end, the welder member is provided with raising members for curving material panels. The material panels are positioned in their curved state. When the curved state is subsequently released, the abutment edges are strongly abutted.

The invention will be more fully understood from the description of the embodiments thereof with reference to the drawings.

DETAILED DESCRIPTION OF THE PREFERRED EMBODIMENTS

A specific embodiment of the invention will now be described with reference to FIGS. 1 to 8.

Figure 1:
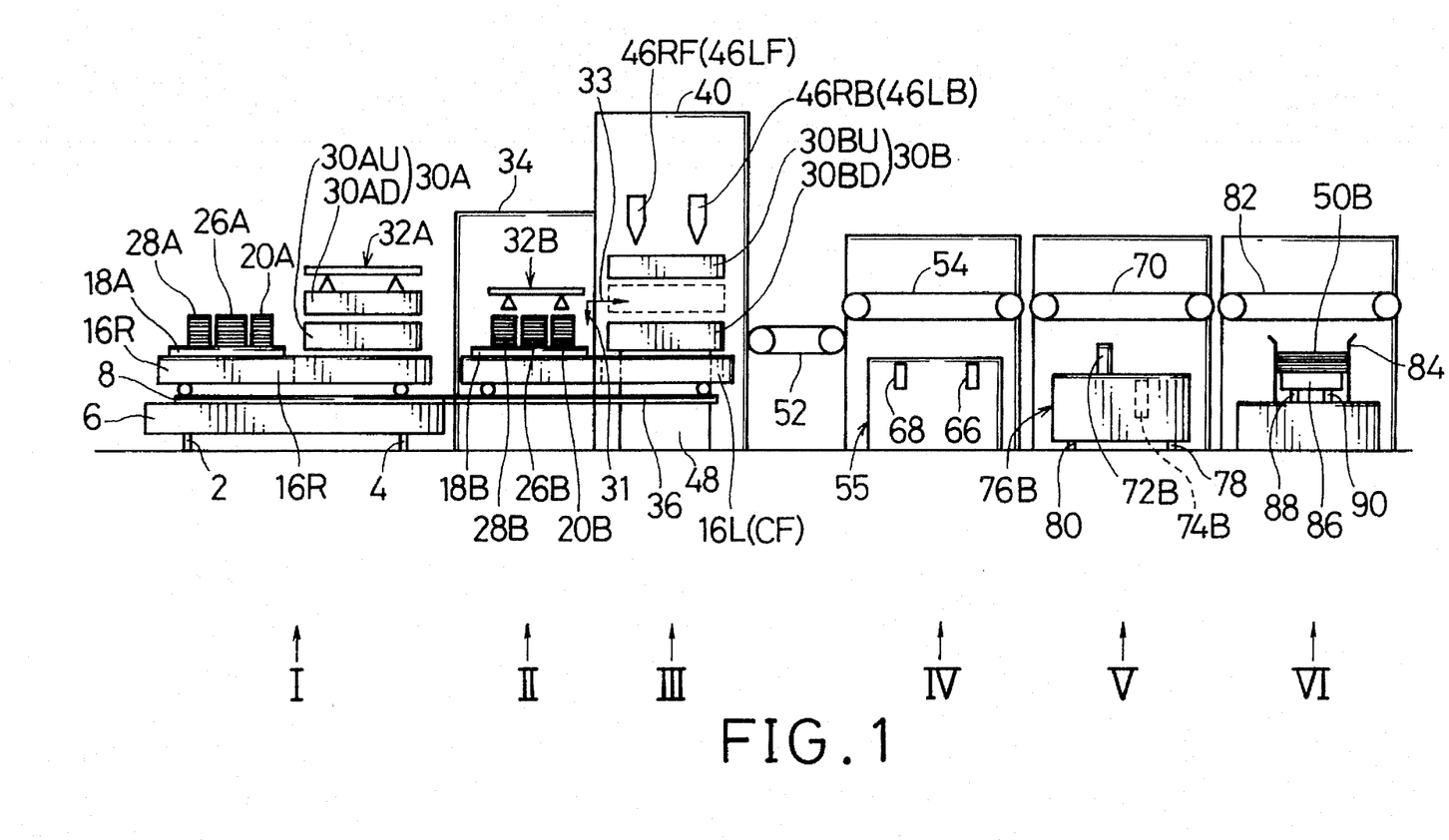
FIG. 1 is a schematic side view showing an embodiment of the apparatus.
Figure 2:
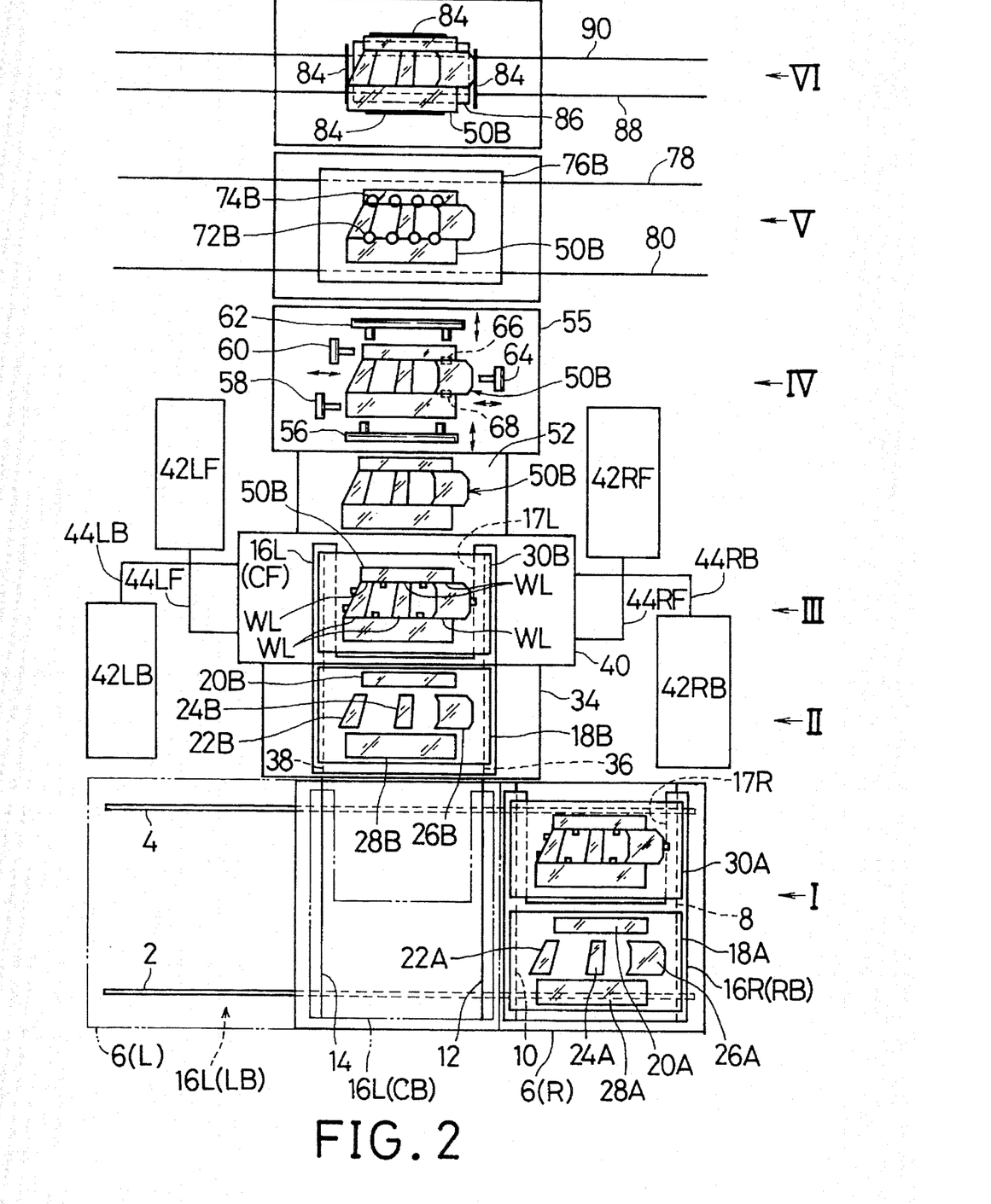
FIG. 2 is a schematic plan view showing the embodiment of the apparatus.

FIGS. 1 and 2 schematically show the apparatus, in side view in FIG. 1 and in plan view in FIG. 2. Reference numerals used in FIGS. 9 and 10 designate like of equivalent parts. "A" in the reference numerals indicates type A, and "B" type B. R in parentheses indicates right side location in the plan view of FIG. 2, L left side location, and C central location. F indicates forward location, and B backward location. Omission of the subscript indicates that the description is common to all types of welded panels. First, prearranging section I will be described. In the prearranging section I, a pair of guide rails 2 and 4 are laid on a floor. The guide rails 2 and 4 extend in a direction perpendicular to a work feed direction (i.e., vertical directions in FIG. 2). A self-running base member 6 can run along the guide rails 2 and 4. Two pairs of guide rails 8 and 10, and 12 and 14, are secured to the top of the base member 6. These guide rails 8 and 10, and 12 and 14, extend in the work feed direction. A right side base 16R rests on the right side guide rails 8 and 10. A left side base 16L rests on the left side guide rails 12 and 14. In the illustrated state of this embodiment, the material panels (20A, 22A, 24A, 26A and 28A) and welder member (30A) for type A are supported on the right side base 16R. The illustrated state is a prearranging state for switching over to the manufacture of type A welded panel after the end of the manufacture of type B, as will be described later in detail. The material panels (20A, 22A, 24A, 26A and 28A) are supported on the base 16R via a pallet 18A. Actually, a plurality of sets of material panels (20A, 22A, 24A, 26A and 28A) are supported as a stack, as shown in FIG. 10. The base 16R has an opening 17R provided at the front end. The welder member 30A is supported on the base 16R at the left and right sides of the opening 17R. As shown clearly in FIG. 1, a feed jaw 32A is provided on the welder member 30A.

On the left side base 16L are supported material panels (20B, 22B, 24B, 26B and 28B) and welder member (30B) for type B welded panel. Like the type A, a plurality of sets of material panels are supported as a stack via a pallet 18B, the base 16L has an opening 17L, and the welder member 30B is supported on the base 16L at the left and right sides of the opening 17L.

A pair of, i.e., left and right, guide rails 36 and 38 are laid from feed-in section II to welding section III. The guide rails 36 and 38 can extend from either guide rails 8 and 10 or guide rails 12 and 14 on the base member 6. When the base member 6 is located at position 6(R), the guide rails 12 and 14 extend for operation. When the base member 6 is at position 6(L), the guide rails 8 and 10 extend. In the illustrated state, the base member 6 is at position 6(R), the guide rails 36 and 38 extend from the guide rails 12 and 14, and the left base 16L has been advanced in the central position. This state corresponds to the manufacture of the type B welded panel.

When the manufacture of the type B welded panel has been completed, the left base 16L is retreated from position (CF) to position (CB). Then, the base member 6 is moved from position 6(R) to position 6(L). As a result, the left base 16L is retreated to position 6L(LB). On the other hand, the right base 16R is advanced to the position (CF) after movement of the base member 6 to the position 6(L). Thus, the state is switched over to one for next manufacturing type A welded panel. When continuously manufacturing the type A after manufacture of the same type A, the material panels for the type A are set on the left base 16L held in the retreated position. When switching the state over to the manufacture of type B, the material panels, welder member and feed jaw for the type B are prepared in advance. When switching is to be made over to a further different type, prearrangement for this type is also made. As an alternative to this system, it is possible to increase the length of the guide rails 2 and 4 and prepare bases 16 for the individual types. The system is selected suitably in dependence on the available space.

Now, the description will be made by assuming that the status is switched over to the manufacture of type B of welded panel by feeding the base 16L to the welding beam irradiation region. The description will be made from a situation of causing the movement of the base 16L, supporting the material panels 20B, 22B, 24B, 26B and 28B, welder member 30B and feed jaw 32B, from the position 16L (LB) to the position 16L(CF).

Above the material feed-in section II, a gate-like frame 34 is disposed such that it is secured in position. While the base 16L is advanced toward the position 16L(CF), the feed jaw 32B, which is set on the welder member 30B, is brought to a position right beneath the frame 34. At this time, the base 16L is stopped tentatively. The base 16 is also self-running. In this state, the feed jaw 32B is mounted on the frame 34. The frame 34 accommodates a mechanism for moving the feed jaw 32B in the directions of arrows 31 and 33 shown in FIG. 1. The feed jaw 32B has a lower suction member, and it thus attracts the material panels 20B, 22B, 24B, 26B and 28B by suction and then rises to feed the material panels to the welding beam irradiation region as shown by arrow 33. The feed jaw 32 is also replaceable because it is necessary to feed material panels having different shapes for different types of welded panels.

When the mounting of the feed jaw 32B is completed, the base 16L is further advanced to the position 16L(CF).

Figure 5A:
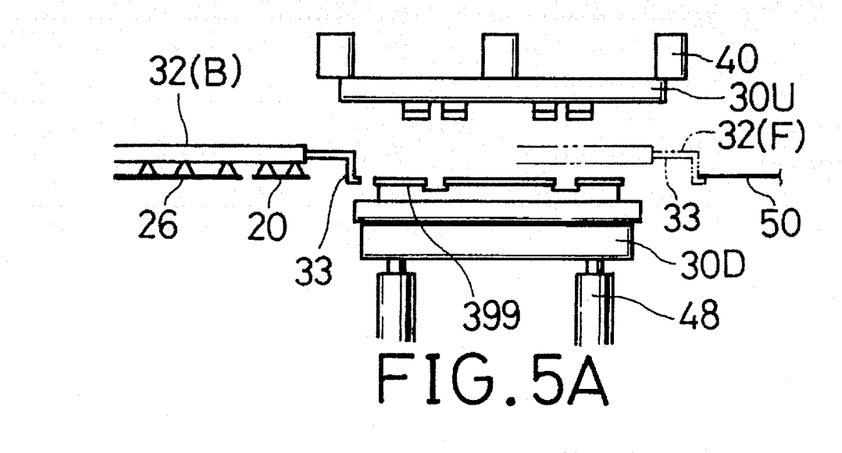
FIGS. 5A to 5D are views showing one cycle of movement of the welder member.

In the section III in FIG. 1, a lift 48 is provided for raising the welder member 30. It can raise the welder member 30 from the base 16 through the opening 17 of the base 16. Above the welding section III, a gate-like frame 40 is disposed such that it is secured in position. As shown in FIG. 5, the welder member 30 comprises two divisions, i.e., an upper and a lower die 30U and 30D. When the welder member 30 (i.e., the two dies 30U and 30D) are raised by the lift 48 until it touches the frame 40, the upper die 30U is secured to the frame 40 by a cylinder (not shown), and thus its lowering is prohibited. That is, with subsequent lowering of the lift 48, the sole lower die 30D is lowered. The feed jaw 32 noted above enters the space between the separated upper and lower dies 30U and 30D, as shown in FIG. 5A.

Figure 3:
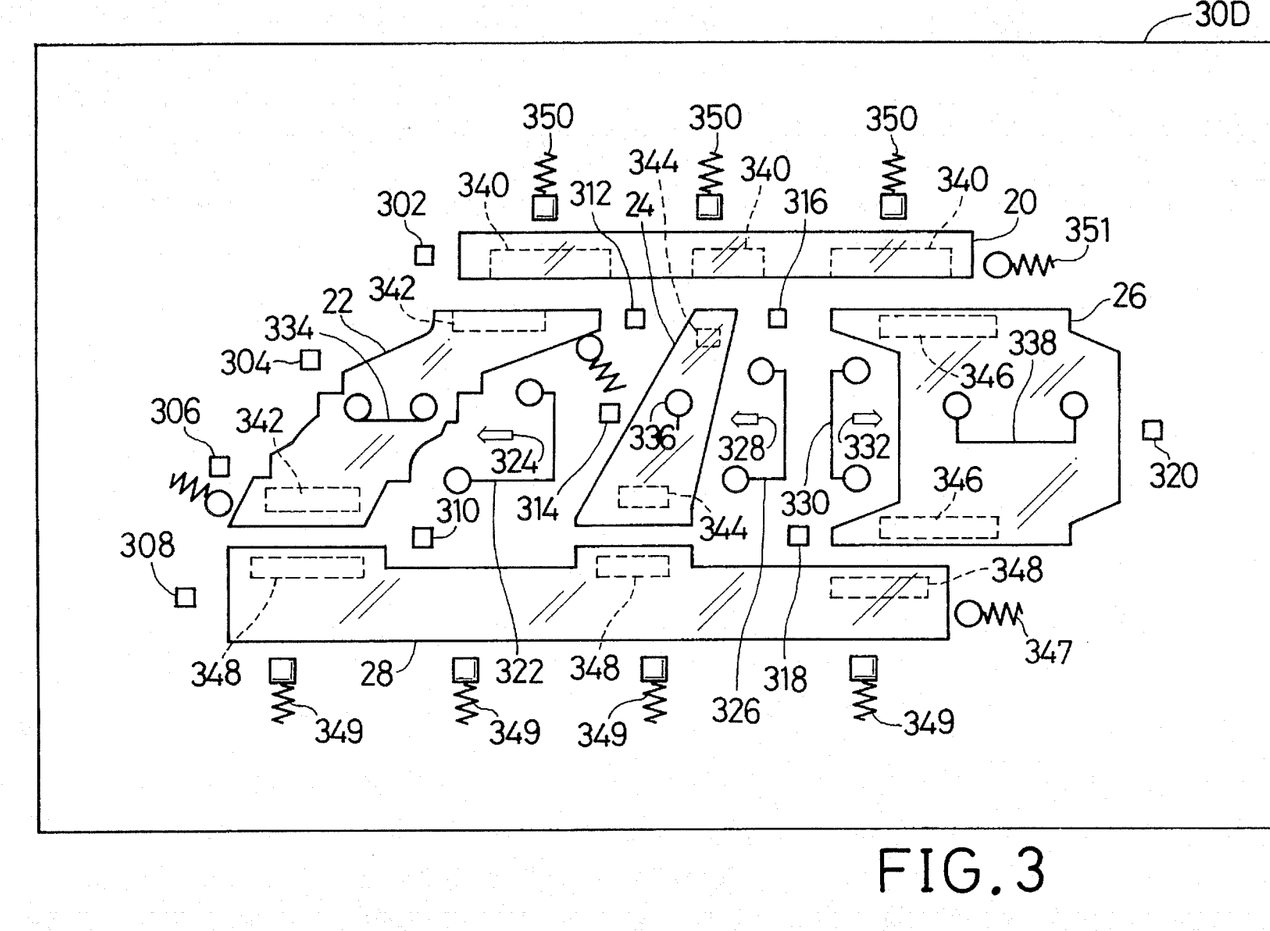
FIG. 3 is a schematic top view showing a lower die of a welder member.

The welder member 30 is roughly as shown in FIGS. 3 and 4. FIG. 3 shows the lower die 30D in plan view. To the lower die 30D are secured stopper pins 302, 312 and 316 for the material panel 20, stopper pins 304 and 306 for the material panel 22, a stopper pin 314 for the material panel 24, a stopper pin 320 for the material panel 26, and stopper pins 308, 310 and 318 for the material panel 28. The material panel 20 is urged by pushers 350 to be in contact with the stopper pins 312 and 316, and also it is urged by a pusher 351 to be in contact with the stopper pin 302. The material panel 28 is urged by pushers 349 to be in contact with the stopper pins 310 and 318, and also it is urged by a pusher 347 to be in contact with the stopper pin 308. The material panel 22 is urged by a pusher 322 toward the side as shown by arrow 324 to be in contact with the stopper pins 304 and 306. The material panel 24 is urged by a pusher 326 toward the side as shown by arrow 328 to be in contact with the stopper pin 314. The material panel 26 is urged by a pusher 330 toward the side as shown by arrow 332 to be in contact with the stopper 320.

Two opposite side material panels 20 and 28 are positioned by being urged against the inner fixed stopper pins 312 and 316 and 310 and 318 from the outside by the pusher 350 and 349.

A raising member 334 is raised from below the material panel 22 to raise the center thereof. A raising member 336 is raised from below the material panel 24 to raise the center thereof. A raising member 338 is raised from below the material panel 26 to raise the center thereof.

Designated at 340 is a clamp for positioning the material panel 20, at 342 a clamp for positioning the material panel 22, at 344 a clamp for positioning the material panel 24, at 346 a clamp for positioning the material panel 26, and at 348 a clamp for positioning the material panel 28. These clamps are mounted on the upper die 30U. On the lower die 30D are mounted base plates corresponding to the clamps.

Figures 4A, 4B:
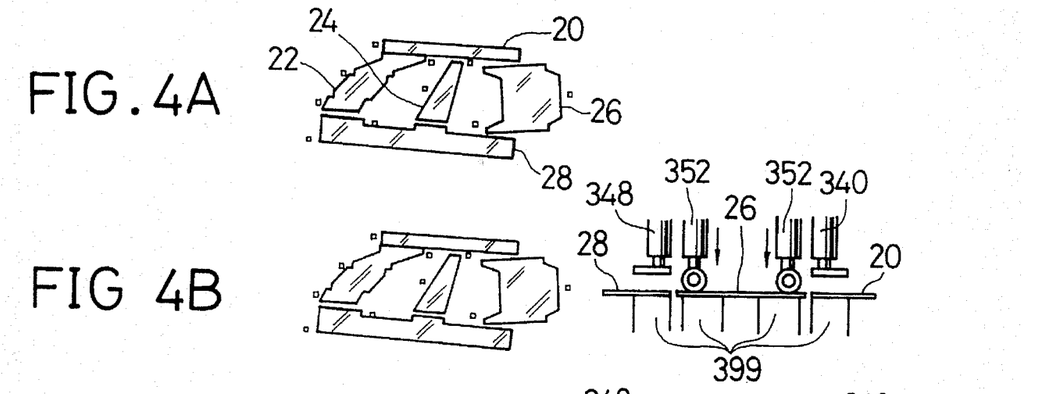
FIGS. 4A to 4G are views showing a manner in which material panels are positioned by the welder member.
Figure 4C:
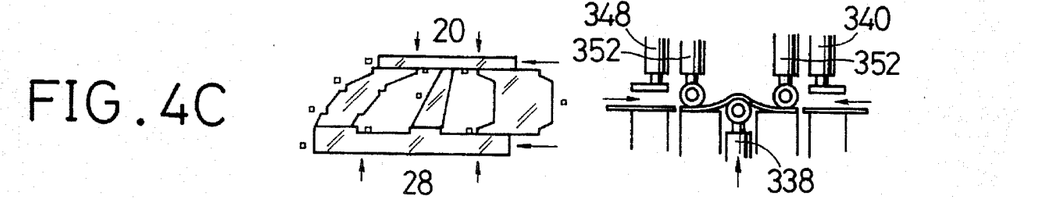
Figure 5B:
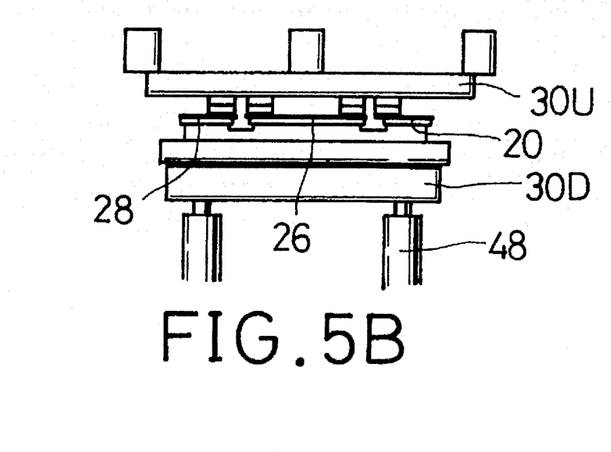

On the side of the upper die 30U, the clamps 340, 342, 344, 346 and 348 are provided on gas springs. When the lower die 30D is raised, the material panels are clamped with a constant pressure between the clamps and base plates, and thus they are positioned. The upper die 30U has push rollers 352 (shown in FIG. 4) for pushing the material panels 22, 24 and 26 on the opposite sides of the raising members 334, 336 and 338. As shown in FIG. 5A, the feed jaw, in a rearwardly located state, attracts by vacuum suction the uppermost set of material panels (20, 22, 24, 26 and 28) in the material panel set stack supported on the pallet 18 and feeds this material panel set to the space between the separated upper and lower dies of the welder member, as shown in FIG. 5A. At this time, if there already is a welded panel 50 in the welder member 30, it is brought to the right in FIG. 5A by an arm 33 of the feed jaw 32 to be transferred onto a conveyer 52 shown in FIG. 1. That is, with a movement of the feed jaw 32 the feeding of the new material panels into the welder member and the feeding of the welded panel 50 out of the welder member are executed simultaneously. When the feed jaw 32 enters the welder member, the vacuum suction is stopped, and the material panels are put on the lower die 30D. Then, as shown in FIG. 5B, the lift 48 is raised to bring the upper and lower dies 30U and 30D into a predetermined positional relation to each other. In this state, the operations shown in FIGS. 4A to 4G are executed in the welder member. More specifically, with the rising of the lower die 30D the push roller 352 on the side of the upper die 30U urges the material panels 22, 24 and 26 against the base plate 399 (FIG. 4B). Then, the raising members 334, 336 and 338 are raised to cause upward curving of the central portion of each of the material panels 22, 24 and 26 (FIG. 4C). This operation is effected within the limits of elasticity of the individual intermediate material panels 22, 24 and 26. At the same time, the pushers 350, 351, 349 and 347 push the opposite side material panels 20 and 28 against the stopper pins 312, 316, 302, 310, and 318 and 308(FIG. 4C). In this way, the opposite side material panels 20 and 28 are positioned (FIG. 4C). The intermediate material panels 22, 24 and 26 intervening between the opposite side panels 20 and 28 are held curved while the side panels 20 and 28 are positioned.

Figure 4D:
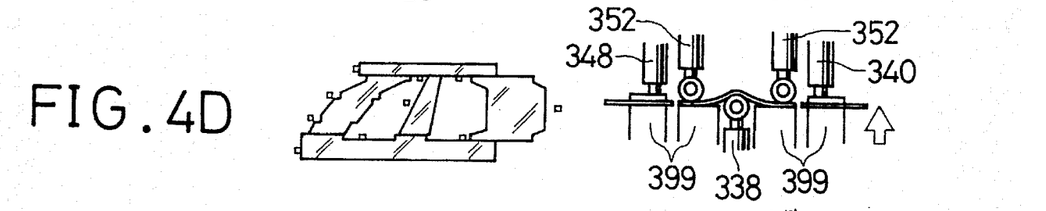
Figure 4E:
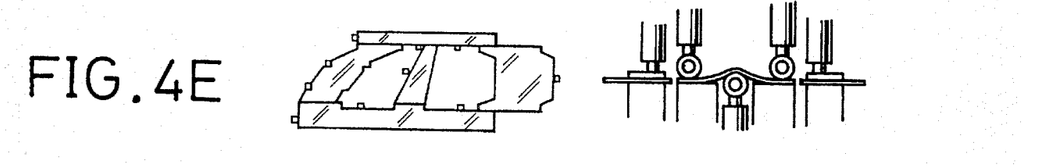
Figure 4F:
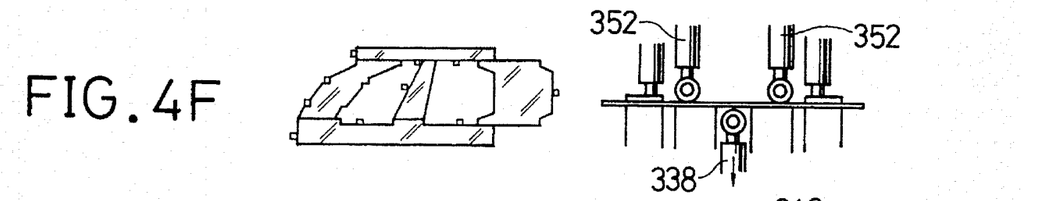
Figure 4G:
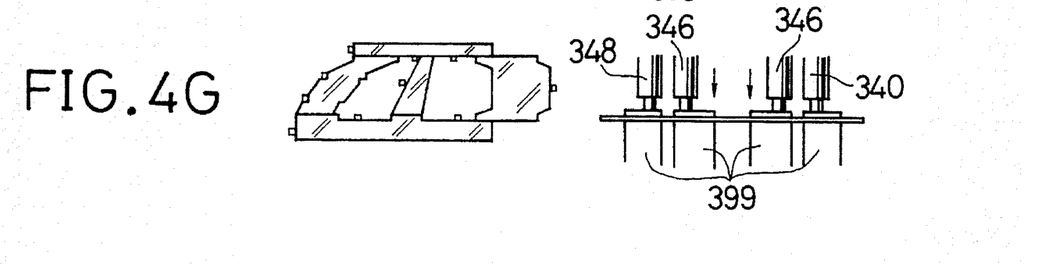

Then, with the progress of rising of the lower die 30D the positioned material panels 20 and 28 are clamped and secured between the clamps 340 and 348 and base plates 399 (FIG. 4D). Then, the pushers 322, 326 and 330 are operated to bring the intermediate material panels 22, 24 and 26 into contact with the stopper pins 304, 306, 314 and 320 (FIG. 4E). In this way, the intermediate material panels 22, 24 and 26 are positioned. Then the intermediate material panels 22, 24 and 26 are released from the curving by causing a retreat of the raising members 334, 336 and 338 and push roller 352 (FIG. 4F). At this time, the edges of the opposite side material panels 20 and 28 and those of the intermediate material panels 22, 24 and 26 are in satisfactory abutment with one another. With further rising of the lower die 30D, the material panels 22, 24 and 26 are clamped and secured between the clamps 342, 344 and 346 and base plates 399 (FIG. 4G).

Figure 5C:
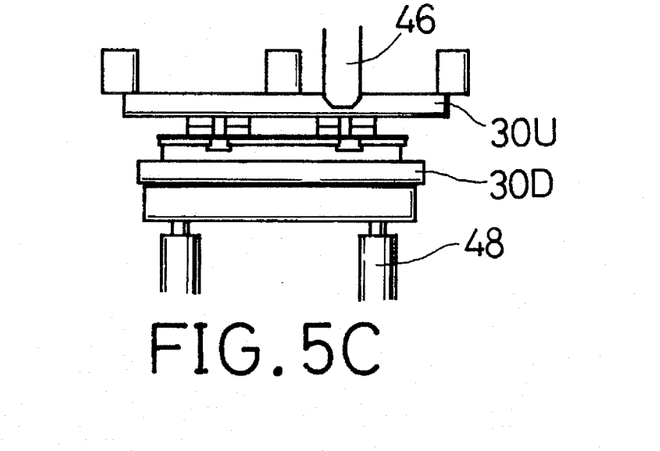
Figure 5D:
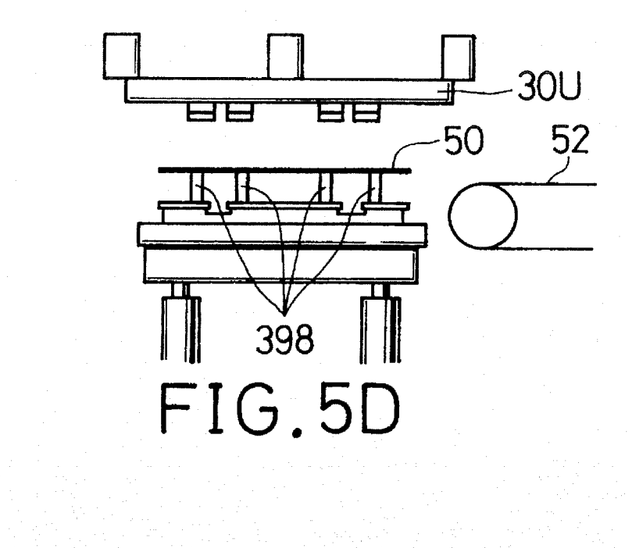

When the abutment of the material panels is effected in the welder member 30 in the above way, as shown in FIG. 5C, a welding torch 46 is scanned along the abutment lines WL, that is, a welding step is executed. The upper die 30U has an opening so that the scanning of the torch 46 is not disturbed.

The torch 46 is programmed so as to scan abutment edges which are predetermined for each type of welded panel. When the type of welded panel is switched, the scanning trace is also switched. The torch 46 includes a magnetic sensor, and it can accurately trace the abutment edges by detecting the position thereof with the magnetic sensor. This technique is disclosed in detail in Japanese Laid-Open Patent Publication No. 59-141391.

The apparatus shown in FIGS. I and 2 has four torches 46LF, 46LB, 46RF and 46RB for effecting the welding of the abutment edges WL. Thus, the welding is effected at four times the speed of the case in which a single torch is used. Each laser oscillator 42 and each torch 46 are coupled to each other by an optical path 44.

As described before in connection with FIG. 5A, when the welded panel 50 is manufactured by the welding of the material panels, it is transferred onto the conveyer 52 with the feed-in of the feed jaw 32. While the lower die 30D remains in its lowered position after the completion of the welding step, a lifter 398 in the lower die 30D is raised to raise the welded panel 50 from the lower die 30D. Thus, the panel 50 is smoothly transferred onto the conveyer 52 by the arm 33 of the feed jaw 32.

Figure 6A:
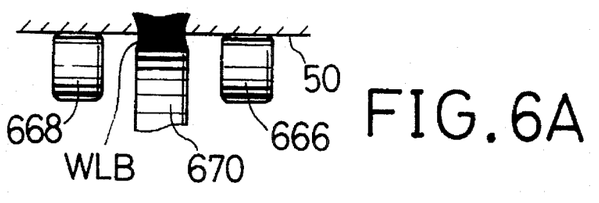
FIGS. 6A and 6B are views showing a grinding head in detail.
Figure 6B:
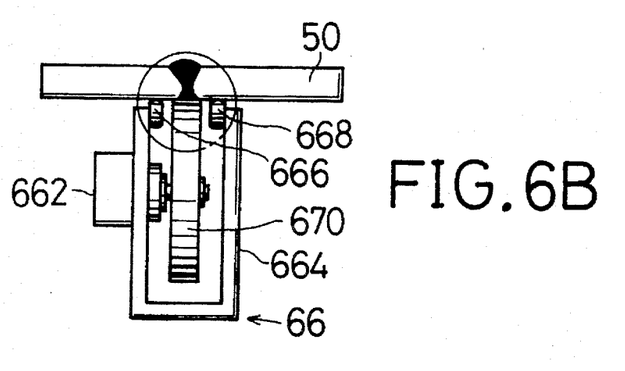
Figure 7:
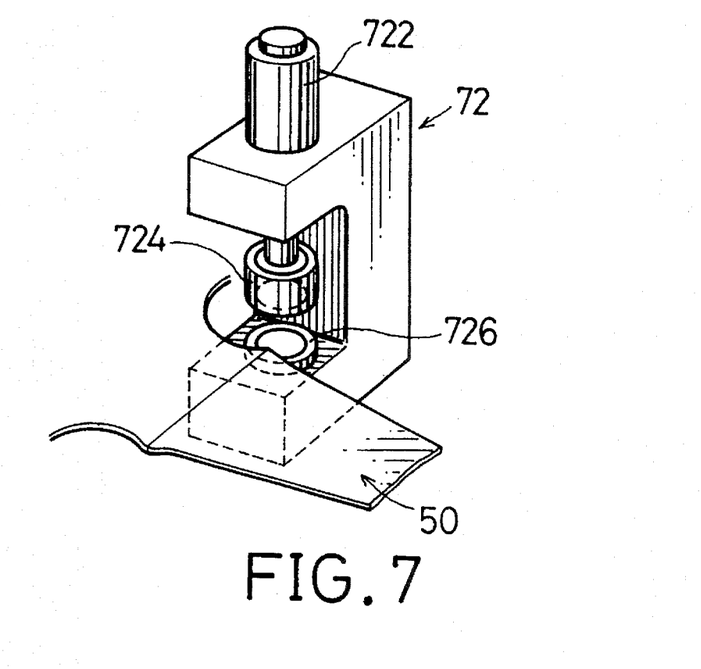
FIG. 7 is a view showing a punching section in detail.

The conveyer 52 feeds the welded panel 50 to the grinding section IV. The grinding section IV, as clearly shown in FIG. 1, has an upper conveyer 54. The conveyer 54 magnetically attracts the welded panel 50, and transports it in this state to a position above a grinder 55. Then, the attraction is cut off, and the welded panel 50 is thus charged into the grinder 55. As shown in FIG. 2, in the grinder 55 cylinders 56, 58, 60, 62 and 64 for positioning the welded panel 50 are movable in the directions of the arrows. The advanced positions of these cylinders are variable for each type of welded panel 50 for positioning the welded edges of each welded panel on the scanning line of grinding heads 66 and 68. The grinding head 66 (or 68) is shown in FIGS. 6A and 6B. Grinding head 66 (or 68) has guide rollers 666 and 668 provided at an end of a guide 664. A rotatable grindstone 670 disposed inside the guide 664 is rotated by a motor 662. As clearly shown in FIG. 6A, the grindstone 670 is retreated slightly (i.e., 0.05 mm in this embodiment) from the rollers 666 and 668. This permits grinding of the weld beads WLB without causing damage to the surface of the welded panel 50. The individual grinding heads 66 ands 68 are programmed such that they are three-axis controlled to be moved along the weld lines of each type of welded panel.

The grindstone has a width of slightly less than 10 mm to permit satisfactory grinding even if the position of the weld beat WLB is deviates within this width. Thus, the accuracy of the positioners 56, 58, 60, 62 and 64 for the welded panel 50 may be of such order that the advanced position noted above can be numerically controlled, and there is no need for replacing the positioners for each type of welded panel.

After grinding in the grinder 55, the welded panel 50 is lifted by a lift (not shown) to be attracted again to the conveyer 54 and transferred to a conveyer 70 in the punching section V. In the punching section V, as clearly shown in FIG. 2, rails 78 and 80 are provided such that they extend in a direction crossing the direction of feeding of the welded panel 50. A punching unit 76, which is prepared for each type of welded panel, rests on the rails 78 and 80. FIGS. 1 and 2 show the apparatus during the manufacture of type B welded panel, and thus the punching unit 76B for the type B is set in the punching section V. While the punching unit 76 is prepared for each type of welded panel, a common punching unit can be used for transversally symmetrical welded panels.

Each punching unit 76 has two punching heads 72 and 74 for permitting processing of both sides of transversally symmetrically welded panels. One of these punching heads is set in an operative position, while the other is held in a retarded position. In the case of FIGS. 1 and 2, the punching head 72 is in the operative position.

The welded panel 50 having been conveyed on the conveyer 70 is charged into the punching unit 70 for positioning substantially in the same way as in the grinder 55. Since the punching unit 76 is prepared for each type of welded panel, accurate positioning can be obtained. When the positioning is completed, a punch 724 is advanced by an oil hydraulic cylinder shown in FIG. 7 toward a die 726, and thus a projected end portion of the welded panel 50 is smoothly cut away.

Figure 8:
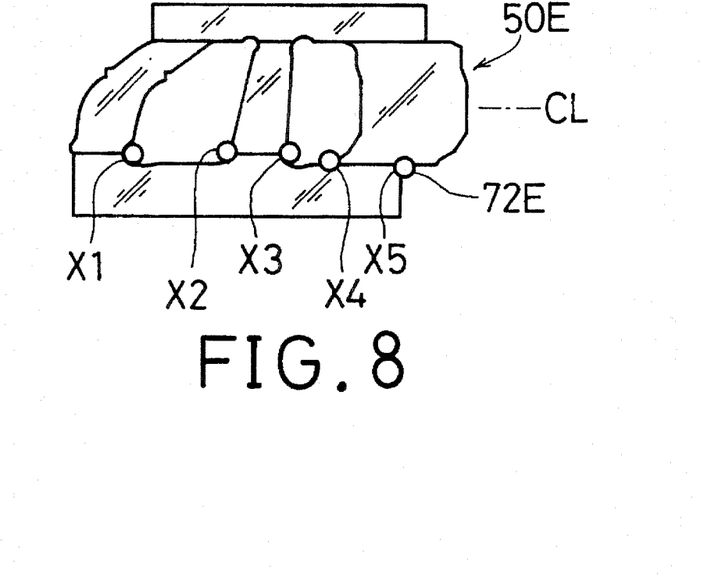
FIG. 8 is a view showing punching spots.

FIG. 8 shows an example, in which corners X1 to X5 of type E welded panel 50E are smoothly cut away by a punching head 72E. The punching head 74B performs punching operation at symmetrical positions with respect to a symmettry line CL, and thus a transversally symmetrical welded panel can be processed with a single punching unit.

After its projected end portions have been cut away by the punching unit 76, the welded panel 50 is lifted by a lift (not shown) to be attracted to the conveyer 70 again and transferred to another conveyer 82. In a stacking section VI, a pair of base guide rails 88 and 90 are laid, and a base 86 can run along these rails. The base 86 has four walls erected from its four sides. In the space defined by these walls, welded panels 50 having been transferred after the punching operation are stacked. When a predetermined number of welded panels are stacked, the base 86 is driven toward the next step, and the next vacant base is brought to the stacking section. Alternatively, it is possible to use two bases alternately.

As has been described in the foregoing, as the feed jaw 32, welder member 30, material panels 20, 22, 24, 26 and 28 and punching unit 76 may be used those which are peculiar to each type of welded panel to be manufactured. Also, the welding torches 46, grinder positioning cylinders 56, 58, 60, 62 and 64 and grinding heads 66 and 68 are controlled according to a program peculiar to each type. In other words, for the steps requiring high accuracy, such as the positioning of material panels for welding and the positioning of the welded panel for punching, the processing units for executing the steps are replaced, for ensuring necessary accuracy, while for the steps requiring comparatively low accuracy such as the positioning of the welded panel for grinding, it is made possible to cope with the type through numerical control of the stopper position.

Further, although it may be possible for the feed jaw 32 to cope with each type by causing displacement of the suction board, the structure of the jaw is simplified such that the jaw as a whole is replaceable. Further, the replacement of the jaw as a whole permits coping with sets of different numbers of material panels.

In this embodiment, the base member 6 running along the rails 2 and 4, and rails 36 and 38 capable of being extended from the rails 8 and 10, or 12 and 14, on the base member 6, constitute means for guiding a given base 16 to the welding beam irradiation region. However, this arrangement is only an example, and it is possible to guide a given base 16 to the welding beam irradiation region in various ways.

Further, various other changes and modifications are possible without departing from the scope of the invention.

What is claimed is:

1. An apparatus for manufacturing a welded panel from a set of panel pieces by abutting edges of said panel pieces against each other, and irradiating said abutted edges with a welding beam, said apparatus being adapted to manufacture a plurality of types of welded panels, said apparatus comprising:

a plurality of base members, said plurality being equal in number to said plurality of types of welded panels being manufactured, wherein each base member supports a plurality of sets of panel pieces of one of said plurality of types; and a welding fixture for holding one set of said panel pieces during welding, said welding fixture being supported by said base member;

feeding means for feeding said set of panel pieces to said welding fixture;

wherein said apparatus includes a welding section where welding is performed;

wherein said base member is movable between a first position outside of said welding section and a second position inside said welding section, said base member physically supplanting a prior base member in said welding section after said panel pieces supported on said prior base member have been welded to form a welded panel.

2. An apparatus according to claim 1, wherein said feeding means includes a feed jaw supported on said base member.

3. An apparatus according to claim 1, wherein said base member includes a welding fixture support space having an opening so that said welding fixture can be raised from said base member by a lift rising through said opening.

4. An apparatus according to claim 3, wherein said welding section includes a welding beam irradiation region and a frame disposed above said irradiation region;

wherein said welding fixture comprises an upper die and a lower die, said upper die being mountable to said frame on rising of said welding fixture by said lift; and wherein said lower die is vertically moved on rising of said lift.

5. An apparatus according to claim 1, further comprising a punching unit including means for positioning said welded panel and means for punching corners of said welded panel, wherein said punching unit is replaceable for each type of welded panel.

6. An apparatus according to claim 1, wherein each type of welded panel is associated with a distinct means for forming an irradiation trace of said welding beam during welding.

7. An apparatus according to claim 1, wherein said set of panel pieces includes a pair of opposite side pieces and intermediate pieces interposed between said opposite side pieces, wherein said welding fixture includes fixed stopper pins for positioning said opposite side pieces; and wherein said welding fixture further includes means for curving said intermediate pieces while said opposite side pieces are positioned.

8. An apparatus according to claim 7, further comprising means for bringing abutting edges of said intermediate pieces into close contact with abutment edges of said opposite side pieces.

9. A method of manufacturing a plurality of types of welded panels from a set of panel pieces comprising the steps of:

preparing a plurality of base members each of which supports a plurality of similar sets of panel pieces for one type of welded panel and a corresponding welding fixture;

transferring one of said base members to a welding section and subjecting said panel pieces to said welding fixture, abutting edges of said panel pieces and welding said abutted edges with a welding beam;

supplanting a prior base member with a welded panel formed thereon by a base member containing panel pieces corresponding to another type of said plurality of welded panels in said welding section by another base member carrying another set of panel pieces.

\* \* \* \* \*